2,791,511

SUBSTANTIALLY WATERPROOF SURFACING MATERIALS

Henry Lipkind, Nutley, Abraham Isidor Sherer, Belleville, and Milton H. Zara, Montclair, N. J., assignors to L. Sonneborn Sons, Inc., a corporation of Delaware No Drawing. Application April 21, 1953, Serial No. 350,212

11 Claims. (Cl. 106—109)

This invention relates to new and useful improvements in substantially waterproof surfacing materials.

So-called high speed gypsum cement is an alpha gypsum (calcium sulfate hemi-hydrate). It is normally produced in well known manner in the autoclave process and is used for structural purposes, including the repair or resurfacing of walls, ceilings, floors, etc., as well as of roads.

Though the alpha gypsum cement sets relatively rapidly, it still requires many hours to do so. Particularly when used as such or as the principal ingredient of a road repair or resurfacing composition, the road or road section may have to be kept closed to traffic for undesirably long periods of time. Furthermore, the high speed gypsum cement does not have as high a compressive strength as may be desired for floors and roads or other structural surfaces subjected to considerable wear and tear, such as by reason of traffic across the same. Still further the alpha gypsum has a relatively high rate of pickup for water, rendering the same objectionable, particularly for surfaces which are subject to considerable wetting such as in dairies, breweries, food, drug and chemical manufacturing or processing establishments and others. The high pickup rate for water is especially harmful for surfaces which are subject to freezing conditions. When surfacing or patching indoor or outdoor surfaces, including roads, with alpha gypsum, the surfaced portions when wetted remain so (due to the relatively high pickup rate for water) for undesirably long periods of time. They may thus create hazardous conditions on floors and roads.

One object of the invention comprises among others an improved surfacing material characterized by a relatively low pickup rate for water and a higher rate of set and compressive strength than conventional alpha gypsum cements.

The foregoing and further objects of the invention will be apparent from the following description:

The composition in accordance with the invention comprises alpha gypsum, a substantially water-soluble metal and preferably alkali metal siliconate, and at least one member of the group consisting of a reactive silica and a metal sulfate of which the metal is a member of the group consisting of aluminum, magnesium and calcium. Within the preferred embodiment of the invention both said reactive silica and said metal sulfate are present in the composition.

The alpha gypsum in accordance with the invention is that conventionally known as such and prepared, as above stated, in the autoclave process and essentially constituting a calcium sulfate hemi-hydrate. It is preferably present in the composition in from 60–90% by weight of total siliconates, gypsum and sulfate and/or silica product. The preferred range of alpha gypsum content is about 80–90% by weight.

The metal sulfate used in accordance with the invention is, as stated, either an aluminum sulfate or magnesium sulfate or calcium sulfate. Best results are obtained with calcium sulfate. The metal sulfate should be present in from 5 to 20% by weight of the total, and preferably about 5 to 8% by weight if also active silica is used; and if no such silica is used, then substantially from 10–40% and preferably about 10 to 15% by weight of total siliconate, gypsum and sulfate.

The reactive silica in accordance with the invention is one having a high reactivity to lime, preferred components being fly ash, diatomaceous earth and such similar materials. The reactive silica should be present in about 5 to 20% by weight of the total siliconate, gypsum, fly ash and/or sulfate and preferably, if also a metal sulfate is used, in about 5 to 12% by such weight; if no metal sulfate is used, then substantially from 10–40% and preferably about 10 to 20% by such weight. The total range, however, of siliconate and metal sulfate and/or reactive silica should be within the broad range of 10 to 40% by weight of the total siliconate, gypsum plus sulfate and/or silica composition.

The siliconate and preferably alkali metal siliconate useful in accordance with the invention should be a substantially water-soluble and preferably alkyl siliconate, which fact appreciably restricts the range of applicable compounds to a relatively limited number of possible organic substituents. The preferred siliconate is sodium methyl siliconate. The alkali metal siliconate should be present in from 0.1–1.0% and preferably 0.25–0.5% by weight of total siliconate, gypsum, metal sulfate and/or fly ash.

The composition is prepared by ordinary mixing of the ingredients in dry, and preferably finely ground, form. In use the composition is mixed with the required amount of gauge water in accordance with conventional practices. It is characterized by a very appreciable acceleration of set which makes it possible to reopen repaired roads in as little as one-half hour after the repair or re-surfacing has been made, as compared with the many hours, if not at times days, previously required even for alpha gypsum. At the same time the resulting cement is substantially impervious to water, has a high compressive strength and repairs made with the same, even when subjected to severe traffic, last a considerably longer period of time than those made with ordinary alpha gypsum cement.

It is of course also possible within the broad scope of our invention to use the new composition together with conventional cement additives, such as aggregate, sand and even asphalt or asphalt compositions in accordance with established practices in the art.

Usually amounts appreciably in excess of 0.5% by weight siliconate in accordance with the invention do not materially lessen the water pickup rate of the resultant set product. On the other hand, the top amount of 1% by weight siliconate herein specified is critical in that amounts appreciably in excess thereof tend to seriously impair the compressive strength characteristics of the set cement obtained from our novel composition.

An example of a composition in accordance with the invention is, for instance, one containing about 88% by weight of alpha gypsum, about 0.25–0.5% by weight of sodium methyl siliconate and about 11.5–11.75% by weight of calcium sulfate. Another example of a composition in accordance with the invention is one containing about 85% by weight of alpha gypsum, about 0.25–0.5% by weight of sodium methyl siliconate and about 14.5–14.75% by weight of fly ash. The compositions were applied by gauging with water to barely flowable consistency and in some cases to the consistency of heavy cream, depending upon degree of flowability required for a particular job. Comparative tests with each of the compositions showed set acceleration and compressive strength of the set product and relatively low water pickup rate to be far superior to those of alpha gypsum alone. The components of the novel material in accordance with the invention act synergistically to produce these beneficial results.

When using within the preferred embodiment of the invention, however, a composition containing both the reactive silica and the metal sulfate, as for instance exemplified by a material containing about 84.2 parts by weight of alpha gypsum, 0.25 part by weight sodium methyl siliconate, 6.3 parts by weight of calcium sulfate and 9.5 parts by weight of fly ash, a still greater set acceleration and compressive strength increase of resultant set product is obtained. In the application of such a compound, set may be obtained in one-tenth or lesser time than is obtainable with the conventional alpha gypsum cement while yet obtaining a compressive strength far superior to that of alpha gypsum cement. Furthermore, the set cement resulting from the above composition, when completely immersed in water, has a water pickup after one hour of only 1.5% by weight and after 24 hours of only 2.5% by weight. This compares with a water pickup of alpha gypsum cement product without siliconate of about 11% in one hour and about 12% in 24 hours. The remarkably low water pickup characterizing the above compound furnished by way of illustration using as little as 0.25% by weight of siliconate is equivalent to a product containing at least 5% by weight of sodium stearate.

The metal sulfates specified as components in accordance with the invention are preferably the anhydrates or the lowest hydrate substantially stable at ordinary temperature.

Though the outstanding characteristics of the compositions in accordance with the invention are their highly accelerated settability and the superior compressive strength and low water pickup of the resultant set products, they exhibit a series of other important properties and characteristics. Compared with ordinary alpha gypsum cement, the new products in accordance with the invention are characterized by better abrasion resistance of the set cement, less shrinkage of the same, superior cohesiveness of the cement and a superior bond to underlying surfaces. At the same time the novel products exhibit a superior workability of the wet mass.

We claim:

1. A surfacing material comprising 60–90% by weight of alpha gypsum and 10–40% by weight of a composition including substantially 0.25–1% by weight of a substantially water soluble metal alkyl siliconate, a lime reactive silica and a substantially anhydrous sulfate of the group of metals consisting of aluminum, magnesium and calcium.

2. A surfacing material in accordance with claim 1 in which said silica is present in the form of diatomaceous earth and in which said alkyl siliconate is alkali metal alkyl siliconate.

3. A surfacing material in accordance with claim 1 in which said silica is present in the form of fly ash and in which said alkyl siliconate is alkali metal alkyl siliconate.

4. A surfacing material in accordance with claim 1 in which said group member is calcium sulfate.

5. A surfacing material comprising 60–90 parts by weight of alpha gypsum, 0.25–1 part by weight of substantially water soluble alkali metal alkyl siliconate, 5–20 parts by weight of a lime reactive silica, and 5–20 parts by weight of a substantially anhydrous sulfate of the group of metals consisting of aluminum, magnesium and calcium.

6. A surfacing material in accordance with claim 5 in which said silica is diatomaceous earth and in which said sulfate is calcium sulfate.

7. A surfacing material in accordance with claim 5 in which said silica is fly ash and in which said sulfate is calcium sulfate, and in which said siliconate is an alkyl siliconate.

8. A surfacing material in accordance with claim 7 in which said siliconate is sodium methyl siliconate.

9. A surfacing material comprising 80–90 parts by weight of alpha gypsum, 0.25–1 part by weight of substantially water soluble alkali metal alkyl siliconate, 5–12 parts by weight of fly ash, and 5–8 parts by weight of substantially anhydrous calcium sulfate.

10. A surfacing material in accordance with claim 9 in which said siliconate is sodium methyl siliconate.

11. A surfacing material comprising substantially 84.2 parts by weight of alpha gypsum, substantially 0.25–0.5 part by weigh of sodium methyl siliconate, substantially 9.5 parts by weight of fly ash and substantially 6.3 parts by weight of substantially anhydrous calcium sulfate.

References Cited in the file of this patent

UNITED STATES PATENTS

| | | |
|---|---|---|
| 1,251,841 | Thatcher | Jan. 1, 1918 |
| 1,266,200 | Blumenberg | May 14, 1918 |
| 2,341,426 | Dailey | Feb. 8, 1944 |
| 2,491,487 | Taulwetter | Dec. 20, 1949 |
| 2,507,200 | Elliott et al. | May 9, 1950 |
| 2,546,586 | Cross | Mar. 27, 1951 |
| 2,588,828 | Greiner | May 11, 1952 |
| 2,643,193 | Weber | June 23, 1953 |

OTHER REFERENCES

Official Digest, October 1951, page 633.
Chemical Engineering, vol. 60 (May 1953), page 266.